OR  3,658,412

United Sta

Seaman

[15] 3,658,412

[45] Apr. 25, 1972

[54] WIDE ANGLE BIOCULAR EYEPIECE

[72] Inventor: William J. Seaman, Center Line, Mich.

[73] Assignee: Chrysler Corporation, Highland Park, Mich.

[22] Filed: Oct. 1, 1970

[21] Appl. No.: 77,223

[52] U.S. Cl..........................350/220, 250/213, 350/175 E
[51] Int. Cl. ......................................................G02b 25/04
[58] Field of Search .......................350/175 E, 220, 219, 223

[56] References Cited

UNITED STATES PATENTS 2,549,158   4/1951   Bertele ............................. 350/175 E
3,516,735   6/1970   Goodell ............................. 350/220

*Primary Examiner*—John K. Corbin
*Attorney*—Talburtt and Baldwin

[57]            ABSTRACT

A wide angle biocular eyepiece comprising four or five spaced optical elements.

6 Claims, 1 Drawing Figure

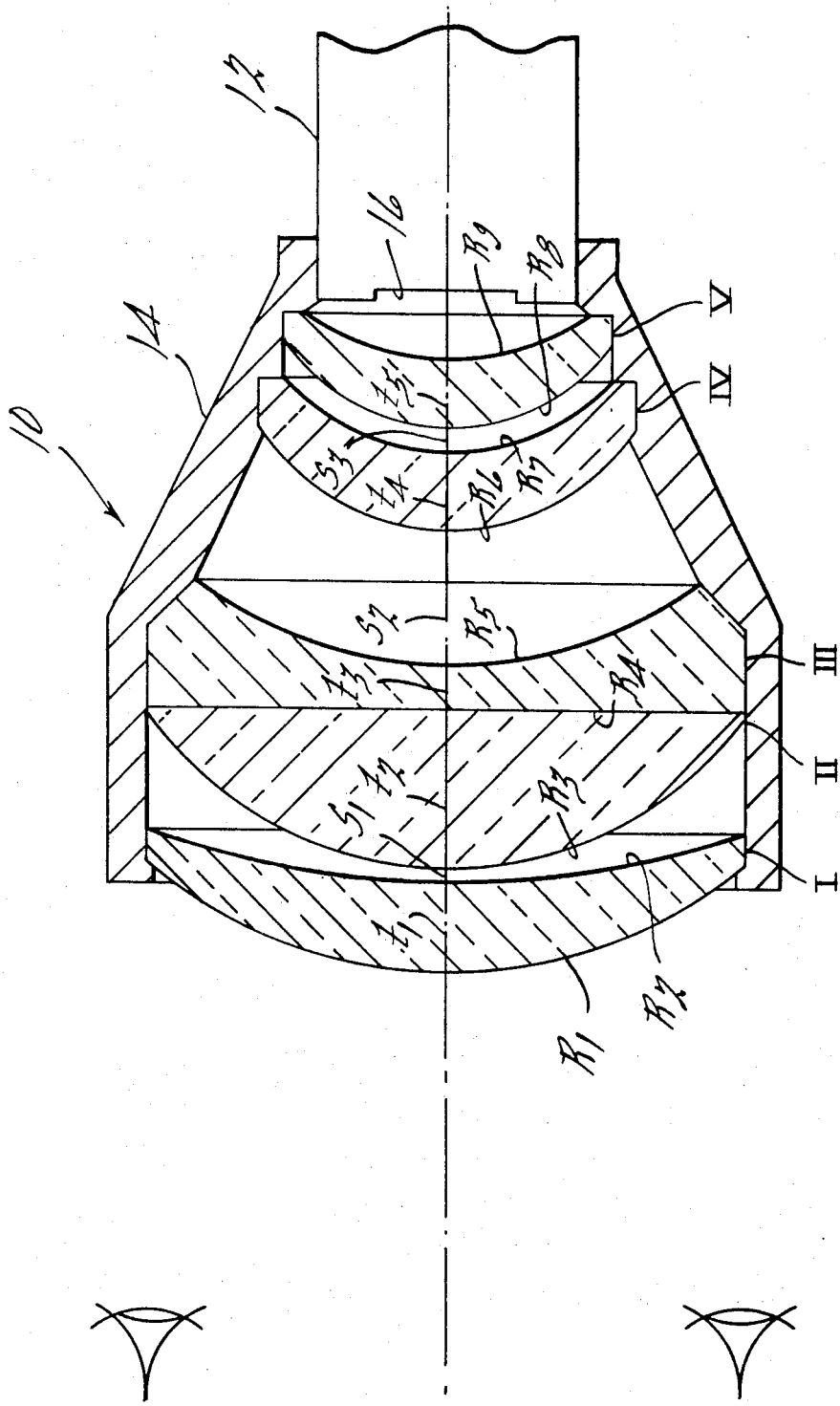

WIDE ANGLE BIOCULAR EYEPIECE

BACKGROUND

Eyepieces used in visual systems instruments usually have an external accessible pupil location where the eye may be placed for the purpose of seeing a large apparent field. Only the rays passing through this well defined exit pupil need be optically corrected. With such a small aperture, the system need only be corrected for astigmatism, field curvature, distortion and lateral color. Spherical aberration, coma and axial chromatic aberration are normally present but the instrument selects so small a portion of the possible rays passing through the eyepiece that these aberrations ordinarily are not significant and correction need not be made for them.

Night vision devices are one type of optical instrument on which eyepieces are used. In both active and passive night vision devices, a visible image is formed on a phosphor luminescent screen with details too small for convenient viewing by the unaided eye. Optical means are required to present an enlarged image to an observer.

Many types of optical systems can be used to observe images formed in electro-optical devices where the photon image appears on a phosphor screen. Most common are the monocular eyepieces, which function as magnifiers and are usually built by enlarging the useful area of the optical elements. The resulting optical systems suffer from intolerable aberrations caused by the lens curvatures being penetrated by light rays at great distances from the optical axis. This ray distance is at least as large as one-half of the interpupillary distance of the observer. Considering the relatively short focal length required to produce sufficient magnification in such optical systems, the relative aperture at which the biocular magnifier must operate is often smaller than 1.0. Correction of optical aberrations for this large relative aperture is difficult at best, and becomes impossible if the number of lens elements available for aberration correction is limited by weight or size constraints. Many well corrected biocular magnifiers have been described in the literature. Two typical examples are shown in U.S. Pat. Nos. 2,885,928 and 2,900,871. From the description of the optical system given in these patents it is apparent that biocular eyepieces require a considerable design effort to provide optical aberration correction across the necessarily large exit pupil diameter.

When eyepieces are used with an image tube, the object plane radiates light in all directions and there is no well defined pupil or stop. If a typical prior art eyepiece is used and is viewed with the eye displaced either longitudinally or laterally, the observer will see considerable amounts of distortion, astigmatism, and color aberration.

This will also be the case when both eyes are used in viewing. Here each eye is displaced laterally from the optical axis and may be looking through different portions at either side of the eyepiece so that the aberrations will not only produce distortions but will blur the image and disturb steriopsis as well.

As a rule, eyepieces which are sufficiently corrected for a small, fixed pupil usually prove to be inadequate when used as magnifiers. What is required is a system that is uniformly good over a large pupil.

Night observation and other viewing through eyepieces can be accomplished much more easily if the observer is permitted to use both eyes for the viewing function without these aberrations. In addition, for prolonged viewing without eye strain, it is necessary that the user observe the image with both eyes.

It is also desirable from a human factors viewpoint to supply as large a field as possible, with a large exit pupil and eye relief. Normally, however, large exit pupils and large fields of view introduce severe geometric aberrations, among them, astigmatism, lateral color and distortion. Spherical aberration becomes a factor on axis if the exit pupil is chosen too large. All these aberrations tend to decrease the theoretical and practical contrast transfer of the eyepiece assembly and must be corrected.

SUMMARY OF THE INVENTION

The present invention relates in general to four or five element eyepieces of sufficient aperture to allow the magnified observation of intermediate images with both eyes of an observer simultaneously to obtain a sharp image across large fields of view. The eyepieces allow for head and eye movement. The biocular eyepieces described herein relate specifically to the observation of images formed on phosphor screens of electronic imaging devices, but may be used for other purposes where biocular viewing is desired. In addition to providing sharp imagery, the eyepieces described herein are useful for large fields of view.

More specifically, this invention provides eyepieces with an external, accessible pupil of such large diameter that the eyes of the observer may comfortably view the image even if not perfectly centered with the optical axis. In such eyepieces all of the emergent rays are adequately corrected, so that it is unimportant between relatively wide limits where the observer's eyes are located either laterally or longitudinally.

It is then a primary object of this invention to provide a wide angle biocular eyepiece suitable for use with image intensifier tubes in night vision equipment to obviate the eye strain which is often encountered with monocular active or passive night observation devices.

It is a general object to provide biocular eyepieces for viewing intermediate images through a single optical channel, that is, through one set of coaxial optical elements.

It is a specific object of this invention to provide biocular eyepieces suitable for magnified viewing of phosphor screens of electro-optical imaging devices, such screens having diameters from 25 to 80 millimeters and emitting visible light of the spectral characteristics represented by the P-20 phosphor curve. The peak of the P-20 spectral distribution is near 5,500A, closely represented by the green e-line of Mercury.

It is a further object to provide eyepieces with the dispersive quality of the optical elements selected so as to provide a particularly sharp achromatic image when used with light sources with a spectral distribution similar to that of a P-20 type phosphor.

It is a still further object of this invention to provide widefield, biocular eyepieces with an apparent field of view of approximately 50° and a long eye relief of approximately 75 millimeters for use with image intensifier tubes having a P-20 phosphor.

It is yet another object of this invention to provide spherically and chromatically corrected biocular eyepieces with 80 mm exit pupil diameter and having an eye relief of not less than 80 mm.

BRIEF DESCRIPTION OF THE DRAWING

The exact nature of this invention as well as other objects and advantages thereof will be apparent from consideration of the following specification and the single FIGURE of the drawing which illustrates a diagramatic embodiment of an eyepiece according to this invention in combination with an image tube.

DESCRIPTION OF THE PREFERRED EMBODIMENTS

Referring to the drawing, this invention consists of a series of lenses or refracting elements collectively identified generally at 10, with such large apertures that both eyes of the observer may comfortably view the intermediate image provided by the phosphor display screen 16 of an image tube 12. The lenses are suitably mounted and maintained in a predetermined space relationship by a housing 14. There is no need for an adjustment of interpupillary distance, and only focusing need be provided for the use of this eyepiece. Focusing may be readily accomplished by providing for a variation of one or more of the air spaces between the refractive elements of the eyepiece, or of the distance to the phosphor screen, both of which are standard practices in the art.

The eyepiece may consist of five air spaced elements or components, two of which may be coupled together to form a cemented doublet in which case the eyepiece will consist of four spaced elements or components as shown in the drawing. The elements are designed to accomplish correction of spherical and chromatic aberrations, coma and astigmatism. The four elements in the embodiment shown are formed from five lenses designated respectively I, II, III, IV and V progressing from the eye position at the front of the eyepiece to the image location at the rear, with lenses II and III forming a doublet. The doublet is surrounded by two meniscus lenses I and IV respectively on each side which are convex toward the observer. The two eyes of an observer are located to the left of lens I on both sides of the optical axis. A strong positive meniscus field lens V, also convex to the observer, is positioned between meniscus lens IV and the display surface 16 of image tube 12 on which the image to be viewed is displayed.

More specifically, the four air spaced elements or components of the preferred embodiment are arranged in the following order front to rear; a positive meniscus lens I convex to the observer; a cemented doublet consisting of a positive lens II and a negative lens III, the doublet being externally concave-convex; a positive meniscus lens IV convex to the observer and a positive meniscus lens V convex to the observer.

All four elements are air spaced from each other by successive air spaces which are designated respectively $S_1$, $S_2$ and $S_3$ and they have axial thicknesses designated respectively $t_1$, $t_2$, $t_3$, $t_4$ and $t_5$.

It is characteristic of these eyepieces that lenses I and V possess strong positive refractive power. The doublet, consisting of a positive crown glass lens II and a negative flint glass lens III and lens IV also possess net positive refractive power. The combination of all elements should be corrected for spherical and chromatic aberrations, coma and astigmatism by means readily apparent to those familiar with this art.

The equivalent focal lengths of the successive lenses I to V as constituted in the above description are given by the mathematical statements contained in Table I herebelow, the focal lengths being designated $F_1$ to $F_5$ for lenses I to V respectively, F being the eyepiece focal length.

TABLE I $2.35F < F_1 < 3.08F$
$1.24F < F_2 < 1.42F$
$1.32F < -F_3 < 1.53F$
$4.29F < F_4 < 7.52F$
$2.30F < F_5 < 2.98F$

The values for axial thicknesses of the successive lenses I to V are given in units of eyepieces focal length and are designated respectively $t_1$ to $t_5$ and the successive interlens air spaces, designated $S_1$ to $S_3$, are given by the mathematical expressions contained in Table 2 herebelow:

TABLE 2

$0.107 < t_1 < 0.207$
$0.263 < t_2 < 0.363$
$0.037 < t_3 < 0.137$
$0.107 < t_4 < 0.207$
$0.072 < t_5 < 0.172$
$0 < S_1 < 0.100$
$0.206 < S_2 < 0.306$
$0 < S_3 < 0.100$

The radii of the successive lens surfaces of lenses I to V which are designated successively $R_1$, $R_2$, $R_3$, $R_4$, $R_5$, $R_6$, $R_7$, $R_8$ and $R_9$ have the following values as given in units of focal length in the mathematical statements in Table 3 herebelow:

TABLE 3

$0.88 < R_1 < 1.08$
$2.06 < R_2 < 2.52$
$0.72 < R_3 < 0.89$
$34.6 < R_4 < 42.4$
$0.85 < R_5 < 1.05$
$0.43 < R_6 < 0.53$
$0.44 < R_7 < 0.54$
$0.38 < R_8 < 0.48$
$0.45 < R_9 < 0.55$

One set of preferred specific values by way of specific example of the focal lengths $F_1$ to $F_5$, the values of the lens thicknesses $t_1$ to $t_5$ and the values for the air spaces $S_1$ to $S_3$ and the values of the radii $R_1$ to $R_9$ are given in Table 4 herebelow:

TABLE 4

$F_1 = 2.667$   $t_1 = 0.157$   $S_1 = 0.035$
$F_2 = 1.323$   $t_2 = 0.313$   $S_2 = 0.256$
$F_3 = 1.418$   $t_3 = 0.087$   $S_3 = 0.017$
$F_4 = 5.459$   $t_4 = 0.157$
$F_5 = 2.597$   $t_5 = 0.122$ $R_1 = 0.9857$
$R_2 = 2.293$
$R_3 = 0.8067$
$R_4 = 38.52$
$R_5 = 0.9523$
$R_6 = 0.4810$
$R_7 = 0.4908$
$R_8 = 0.4305$
$R_9 = 0.5009$

Although only certain embodiments of the present invention have been shown and described in detail, other forms are possible and changes may be made in the constructional details thereof within the specified limits without departing from the spirit of the invention as defined in the claims.

What is claimed is:

1. A biocular eyepiece comprising four air spaced components including:
   a positive meniscus lens I convex to the observer;
   a cemented externally concave-convex doublet consisting of a positive lens II and negative lens III;
   a positive meniscus lens IV convex to the observer,
   and a positive concave-convex lens V convex to the observer.

2. An eyepiece according to claim 1 having an aperture of about F/1.0.

3. The eyepiece of claim 1 wherein the exit pupil is larger than the overall focal length of the device.

4. The eyepiece of claim 1 including means for establishing optical contact between said element V and an intermediate imaging means.

5. The eyepiece of claim 4 wherein said means comprises a plano-concave optic faceplate.

6. An eyepiece with substantially large apertures to permit biocular viewing of fields of view up to 60° from an eye relief distance of up to about 80 mm comprising five air spaced elements including:
   a positive meniscus lens convex to the observer designated I,
   a cemented externally concave-convex doublet consisting of a positive and a negative lens designated II and III respectively,
   a positive meniscus lens convex to the observer designated IV, and
   a positive concave-convex lens designated V;
   the value for the constructional data for said eyepiece being given substantially in the tables of mathematical expressions herebelow wherein $F_1$ to $F_5$ respectively represent the equivalent focal length of lenses I to V, $R_1$ to $R_9$ respectively represent the radii of the successive lens surfaces of the lens I to V, $t_1$ to $t_5$ represent the axial thickness of lenses I to V, and $S_1$ to $S_3$ represent the successive interlens air spaces between the lenses:

$F_1 = 2.667$   $t_1 = 0.157$   $S_1 = 0.035$
$F_2 = 1.323$   $t_2 = 0.313$   $S_2 = 0.256$
$F_3 = 1.418$   $t_3 = 0.087$   $S_3 = 0.017$
$F_4 = 5.450$   $t_4 = 0.157$
$F_5 = 2.597$   $t_5 = 0.122$ $R_1 = 0.9857$
$R_2 = 2.293$
$R_3 = 0.8067$
$R_4 = 38.52$
$R_5 = 0.9523$ $R_n = 0.4810$
$R_7 = 0.4908$
$R_x = 0.4305$
$R_y = 0.5009$

\* \* \* \* \*